United States Patent [19]

Thomas

[11] 4,300,690

[45] Nov. 17, 1981

[54] SECURITY DISPLAY RACK

[75] Inventor: Robert E. Thomas, Santa Ana, Calif.

[73] Assignee: Securax, Inc., Ft. Worth, Tex.

[21] Appl. No.: 121,102

[22] Filed: Feb. 13, 1980

Related U.S. Application Data

[62] Division of Ser. No. 907,770, May 19, 1978.

[51] Int. Cl.³ .............................................. C05B 73/00

[52] U.S. Cl. .......................................... 211/4; 70/59; 211/124

[58] Field of Search ........................... 211/4, 7, 124, 8; 70/58, 59, 62

[56] References Cited

U.S. PATENT DOCUMENTS

| | | | |
|---|---|---|---|
| 2,068,451 | 1/1937 | Elmore | 211/8 |
| 2,953,251 | 9/1960 | Stone et al | 211/4 |
| 3,472,385 | 10/1969 | Shapiro et al. | 211/7 |
| 3,507,402 | 4/1970 | Barbee | 211/204 |
| 3,735,875 | 5/1973 | Parillo | 211/7 |
| 3,807,574 | 4/1974 | Lanza | 211/207 |
| 3,993,195 | 11/1976 | Caligiuri | 211/7 |
| 4,204,601 | 5/1980 | Thomas | 211/4 |

FOREIGN PATENT DOCUMENTS

| | | | |
|---|---|---|---|
| 2107377 | 9/1971 | Fed. Rep. of Germany | 211/124 |

*Primary Examiner*—Roy D. Frazier
*Assistant Examiner*—Robert W. Gibson, Jr.
*Attorney, Agent, or Firm*—Gordon L. Peterson

[57] ABSTRACT

A security display rack comprising an elongated support member appropriately elevated above a supporting surface and an elongated locking member. The support member has an elongated surface and a plurality of grooves extending through the support member and opening at the elongated surface. Each of these grooves is adapted to have at least a portion of an article inserted therein with the grooves spacing the articles along the support member. The locking member is mounted for movement so that it can open and at least partially close the open ends of the grooves. The locking member has a closed position in which it lies along the elongated surface of the support member and at least partially closes the open ends of the grooves. In the closed position, the articles inserted into the grooves either cannot be withdrawn from the support member of their withdrawal is impeded. The locking member can be locked in the closed position.

10 Claims, 8 Drawing Figures

SECURITY DISPLAY RACK

This is a division of application Ser. No. 907,770 filed May 19, 1978.

BACKGROUND OF THE INVENTION

A growing problem in department stores is the mass theft of merchandise from display racks. Expensive garments, such as suits, are typically hung on hangers which in turn are suspended from a conventional garment display rack in the usual manner. Because the hangers are very easily removed from the rack, a large number of the hangers can be simultaneously removed from the rack quite easily, and this enables the thief to commit the theft during the time that the store is open for business.

One approach is to put the merchandise within locked cabinets, such as is done, for example, with more expensive jewelry. This approach is not satisfactory because it reduces customer accessibility to the merchandise. Another approach employs a rack on which clothes hangers can be hung. The hangers are locked on the rack by a bar which is suitably locked over the top of the hangers. This rack is generally considered too unsightly for a merchandise display rack, and it does not properly space the articles hung on the rack. This is particularly true on a certain standard form of rack which extends at a 30 degree angle relative to the horizontal. Also, this prior art construction is not adapted for retrofit on existing nonlocking display racks.

SUMMARY OF THE INVENTION

The present invention generally overcomes the disadvantages noted above in providing a security display rack which is readily adapted for retrofit on existing non-security display racks. The locking features of this invention are incorporated into the display rack in such a way as to not adversely affect the appearance of the rack. This is considered particularly important in the merchandising field.

The security display rack can advantageously include an elongated support member having an elongated surface and a plurality of grooves extending through the support member and opening at the elongated surface. Each of the grooves is adapted to have at least a portion of an article inserted therein with the grooves serving to space the articles along the support member. The "article" which is received in the groove may be the item which is to be sold or it may be, or include, a hanger for the article to be sold. For example, articles, such as necklaces, ladies' purses, golf clubs, guns, etc., may be received directly into the groove, whereas clothing, such as men's suits, are customarily hung on a hanger and the hanger would be hung on the support member in one of the grooves.

An elongated locking member which is adapted to cover the open ends of the grooves is provided for retaining the articles in the grooves. The locking member is mounted for movement to open and at least partially close the open ends of the grooves. The locking member has a closed position in which it lies along the elongated surface of the support member to at least partially close the open ends of all of the grooves sufficiently to prevent or substantially impede withdrawal of the article from the groove. Locking means is provided for locking the locking member in the closed position.

To permit articles to be suspended from the support member, the support member is preferably elevated above a supporting surface, and means coupled to the supporting surface is provided for this purpose. A commonly used form of display rack of the non-security type typically includes a base and an upwardly extending riser into which a post from the standard display rack is telescopically received. To adapt the present invention for retrofit on this commonly used standard form of rack, it is preferred to provide a post coupled to the support member and attachable to the riser. In this manner, the base and riser from the existing units can be salvaged.

The support member can be simply and inexpensively constructed by making it in the form of a channel having first and second legs interconnected by a web. With this construction, each of the grooves includes a notch or groove section in each of the first and second legs. The channel also serves as a means for concealing various other portions of the display rack, such as the locking means.

The locking member can be mounted for movement to open and close the open ends of the grooves in different ways. For example, the locking member can be pivotally mounted on the support member for movement between the closed position and a position in which one or more of the grooves is open to permit removal of the article. Alternatively, the locking member can be appropriately mounted for sliding movement along the elongated surface of the support member. In a preferred construction, the mounting means includes one or more flanges on one of the support member and the locking member and a corresponding number of recesses on the other of the support member and the locking member. The flanges are received in the recess to permit the locking member to be slid over the open ends of the grooves to open and close the open ends of the grooves. When the support member is in the form of a channel, flanges can be inexpensively and advantageously provided by appropriately configuring the end portions of the legs of the channel remote from the web. For a neater appearance, the flanges extend outwardly of the associated leg. Corresponding recesses are appropriately formed on the locking member to slidably mount the locking member on the support member.

Although the locking member can be locked in the closed position in different ways, in a preferred construction, a first locking element is provided on the locking member within the channel. A second locking member is mounted for movement within the channel, and the second locking element is movable from outside the channel between a locking position and a releasing position.

Preferably, both ends of the channel are closed. One end of the channel can advantageously be closed by a tab on the locking element. The tab also forms a means to facilitate grasping and sliding of the locking member.

The support member can be mounted with the grooves opening in various different directions, such as upwardly or laterally. For example, upwardly opening grooves are particularly desirable for suspending articles on the supporting member, whereas laterally opening grooves can be used for articles, such as guns and golf clubs which can rest on a surface below the support member.

The invention, together with further features and advantages thereof, may best be understood by reference to the following description taken in connection with the accompanying illustrative drawings.

DESCRIPTION OF THE PREFERRED EMBODIMENTS

Figure 1:
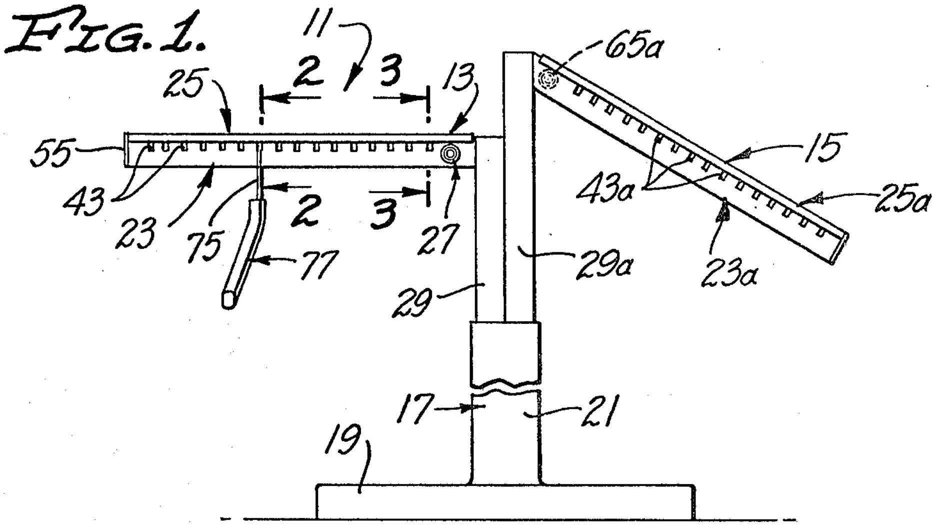
FIG. 1 is an elevational view of one form of a security display rack constructed in accordance with the teachings of this invention.

FIG. 1 shows a security display rack 11 which includes security display devices 13 and 15 and a base assembly 17. Although the base assembly can be of various different constructions, a commonly used base assembly includes a very heavy base 19 and a tubular riser 21 extending vertically upwardly from a central region of the base. The security display rack 11 is of the type which can be advantageously used for displaying articles, such as men's suits.

The security display device 13 includes an elongated support member 23, an elongated locking member 25 mounted on the support member, locking means 27 for locking the locking member on the support member, and a post 29 suitably rigidly affixed to one end of the support member and extending perpendicular thereto. The lower end of the post 29 is telescopically received within the riser 21. Conventional detent means (not shown) retain the post 29 in any one of a plurality of selected vertically spaced positions within the riser 21. The base assembly 17 is of the type commonly found in department stores, and the display device 13 is adapted for retrofit on these existing base assemblies.

Figure 2:
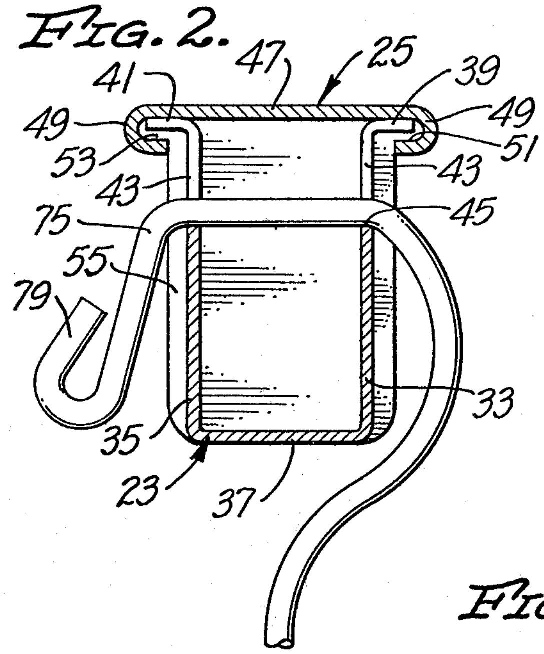
FIG. 2 is an enlarged sectional view taken generally along line 2—2 of FIG. 1.

The support member 23 can advantageously take the form of a steel channel (FIG. 2) which includes a pair of parallel legs 33 and 35 integrally joined together by a web 37 which is perpendicular to the legs. The end portions of the legs 33 and 35 remote from the web 37 are turned outwardly to form integral flanges 39 and 41, respectively, which extend discontinuously for the full length of the associated legs. A plurality of grooves are formed in the support member and, in the embodiment illustrated, each of the grooves includes a pair of aligned groove sections or notches 43 formed in the legs 33 and 35. Each of the notches 43 has an end surface 45 and opens at the free ends of the associated legs 33 and 35, which free ends form an elongated surface of the support member 23. The presence of the notches 43 causes the flanges 39 and 41 to be discontinuous. The end surface 45 is spaced upwardly as shown in FIG. 2 from the web 37. One end of the channel-shaped support member 23 is closed by the post 29.

The locking member 25 in the embodiment illustrated is an integral member preferably constructed of a strong material, such as steel. The locking member 25 has an elongated cover section 47 (FIG. 2) and integral reverse bend sections 49 extending along the opposite longitudinal edges of the cover section to define elongated recesses 51 and 53. One end of the locking member has an enlarged tab 55 extending downwardly from the locking member to close the adjacent end of the support member 23 in the closed position of the locking member.

The support member 23 and the locking member 25 are sized so that the recesses 51 and 53 can slidably receive the flanges 39 and 41, respectively, to mount the locking member 25 on the support member 23 for sliding movement along the end of the support member remote from the web 37. The locking member 25 can be slid along the support member 23 to open and close the open upper ends of the notches 43 as may be desired. The locking member 25 can be moved to a position in which it closes the upper ends of all of the notches 43 to define a closed position of the locking member. In the embodiment illustrated, the locking member 25 can be moved until the tab 55 abuts the end of the support member whereupon further movement of the locking member to the right is prevented.

Figure 3:
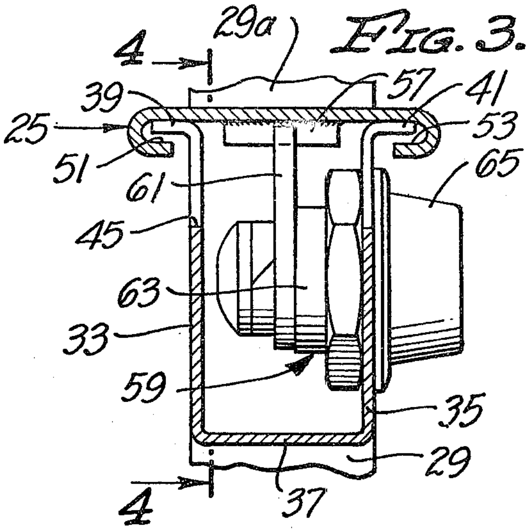
FIG. 3 is an enlarged sectional view taken generally along line 3—3 of FIG. 1.
Figure 4:
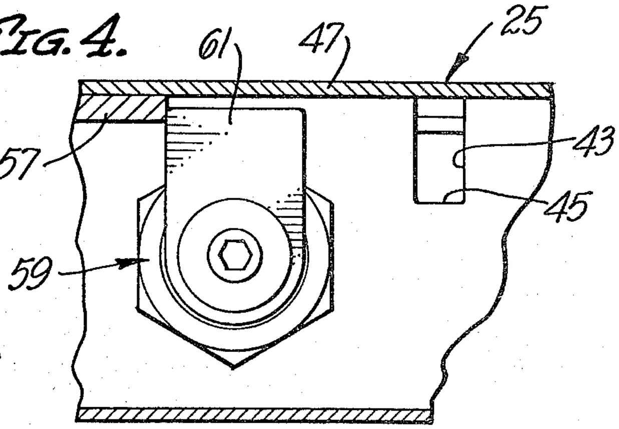
FIG. 4 is a fragmentary sectional view taken generally along line 4—4 of FIG. 3.
Figure 5:
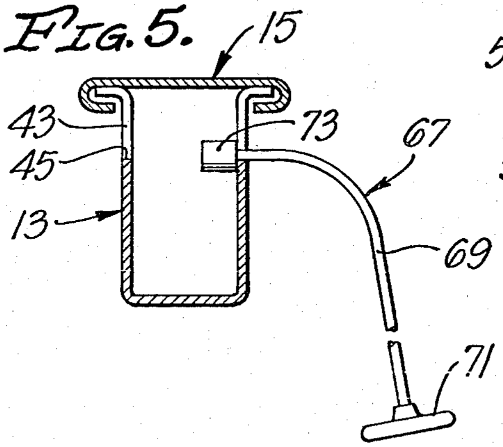
FIG. 5 is a sectional view similar to FIG. 2 showing how a leash can be used with the support member.

The locking means 27 can then be used to lock the locking member 25 in the closed position. Although the locking means 27 may take different forms, in the embodiment illustrated, it includes a locking element 57 (FIGS. 3 and 4) rigidly affixed to the locking member 25 and extending downwardly into the channel-shaped support member 23. The locking means also includes a key lock 59 of conventional construction and mounted on the support member 23. The lock 59 includes a locking element 61 within the channel-shaped support member, a rotatable member 63 carrying the locking element 61, and a key receiving unit 65. By inserting an appropriate key into the unit 65, the rotatable member 63 and the locking element 61 can be rotated between locking and releasing positions. In the locking position, the locking element 61 engages one end of the locking element 57 to prevent movement of the locking member 25 to the right as viewed in FIG. 4. The locking element 61 cannot be moved out of the locking position without the key. In the releasing position, the locking element 61 is rotated clockwise as viewed in FIG. 4 so that it will not interfere with passage of the locking element 57.

The security display device 13 may also include a conventional leash 67 for purposes to be described. The leash 67 includes an elongated flexible cable 69 and enlargements 71 and 73 affixed to opposite ends of the cable.

In use of the rack 11, with the locking member 25 in the open position, the wire loop portion 75 of a coat hanger 77 may be placed into an aligned pair of the notches 43 as shown in FIG. 2. The garment to be displayed, such as a man's suit, is hung on the coat hanger. The locking member 25 is then slid to the closed position, and the key (not shown) is used to move the locking element 61 to its locking position. In this position, the locking member 25 closes the upper ends of the notches 43 into which the wire loop portion 75 is placed so that the coat hanger cannot be removed from the support member 23 by lifting it upwardly. Moreover, the wire loop portion 75 has the usual enlargement 79 at the free end thereof, and this enlargement prevents withdrawal of the coat hanger by pulling or rotating it.

Accordingly, the coat hanger cannot be removed from the support member without unlocking the locking means 27. Alternatively, the notches 43 can be larger so that the hanger 77 can only be withdrawn with difficulty.

If desired, each of the hangers 77 may have one of the leashes 67 associated therewith. In this event, the leash 67 is run through the sleeve of the jacket hung on the hanger and the enlargement 71 lies on the outside of the usual suit jacket buttonhole. The cable 69 is sufficiently long so that the coat can be put on by a customer but to free the coat from the display rack 11, the cable must be withdrawn from the support member 23 and pulled completely through the jacket sleeve and the jacket buttonhole. The enlargement 73 is small enough to pass through the buttonhole.

The security display device 15 is identical to the security display device 13, except that the support member 23*a* is inclined relative to the post 29*a* so that the support member extends downwardly as it extends away from the post. By way of example, the angle of inclination may be 30 degrees relative to the horizontal. A key receiving unit 65*a* is adapted to receive the key from the opposite side of the display rack 11. Of course, the dimensions of the components of the devices 13 and 15 can be different and portions of the device 15 corresponding to portions of the device 13 are indicated by corresponding reference numerals followed by the letter "a."

Figure 6:
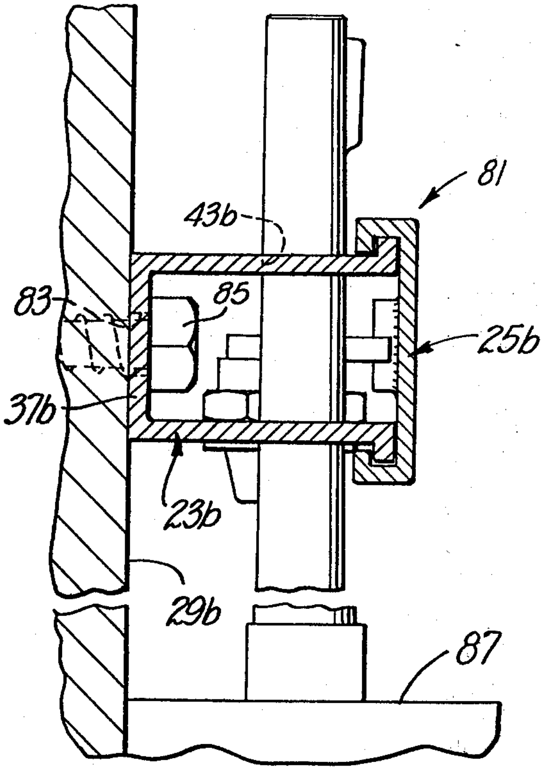
FIG. 6 is a fragmentary elevational view partially in section of a second form of a security display rack constructed in accordance with this invention.

FIG. 6 shows a security display device 81 and portions of the device 81 corresponding to portions of the device 13 are designated by corresponding reference numerals followed by the letter "b." The display device 81 includes a support member 23*b* and a locking member 25*b* which may be identical to the corresponding components of the device 13, except for the dimensions of the notches 43*b* and openings 83 in the web 37*b* for accommodating fasteners, such as screws 85 for attaching the support member 23*b* to suitable supporting structure 29*b*, such as a post or a wall. The device 81 is particularly adapted for storing articles, such as guns, golf clubs, etc. which rest on a supporting surface 87 and extend vertically up through the notches 43*b*. To accomplish this, the support member 23*b* is turned as shown in FIG. 6 so that the notches 43*b* open laterally, rather than upwardly as in the embodiment of FIGS. 1–5.

Figure 8:
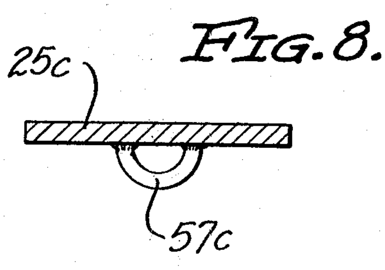
FIG. 8 is an enlarged sectional view taken generally along line 8—8 of FIG. 7.
Figure 7:
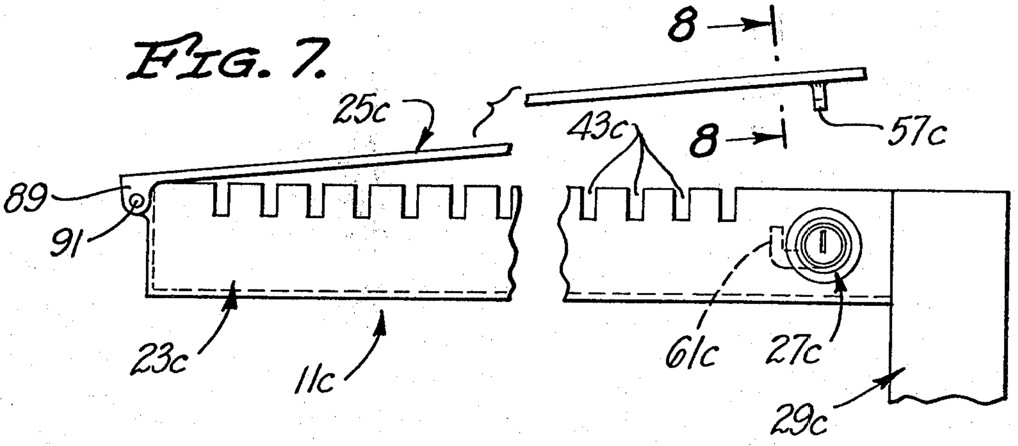
FIG. 7 is a fragmentary elevational view of a third form of a security display rack constructed in accordance with this invention.

FIG. 7 shows a display rack 11*c* which is identical to the display rack 11 in all respects not specifically shown or described herein. Portions of the display rack 11*c* corresponding to portions of the display rack 11 are designated by corresponding reference numerals followed by the letter "c." The primary difference between the racks 11*c* and 11 is that the former eliminates the flanges 39 and 41 and the recesses 51 and 53, and the locking member 25*c* is pivotally attached to the support member 23*c* for pivotal movement about a horizontal axis. To implement this, the locking member 25*c* includes a pair of ears 89, and a pin 91 extends through these ears and the support member 23*c* to pivotally mount the locking member 25*c* on the support member. In addition, the locking element 57*c* (FIG. 8) is in the form of an eye or a loop and the locking element 61*c* is in the form of a hook to engage the eye.

Although exemplary embodiments of the invention have been shown and described, many changes, modifications and substitutions may be made by one having ordinary skill in the art without necessarily departing from the spirit and scope of this invention.

I claim:

1. A security display rack for articles, said rack comprising:

an elongated support member having an elongated surface facing in a first direction and a plurality of grooves extending through the support member and opening at said elongated surface, each of said grooves being adapted to have at least a portion of one of the articles inserted therein with the grooves spacing the articles along the support member;

an elongated locking member adapted to at least partially cover the open ends of said grooves to impede removal of the articles from the grooves;

means for mounting the locking member for pivotal movement about a pivot axis between open and closed positions;

said locking member lying along the elongated surface of the support member in said closed position to at least partially close the open ends of all of the grooves sufficiently to impede removal of the articles from the grooves;

said pivot axis extending generally transverse to the elongated support member and the locking member being movable about the pivot axis away from the grooves generally in said first direction toward said open position;

locking means for locking the locking member in said closed position;

means coupled to the support member for elevating the support member above a support surface; and said elongated support member having a recess therein and said locking means including a first locking element carried by said elongated locking member and adapted to be received in said recess in said closed position and a second locking element in said recess and carried by said elongated support member, said pivot axis being adjacent one end of the elongated locking member and said first locking element is adjacent the other end of said elongated support member.

2. A security display rack as defined in claim 1 wherein said elevating means elevates the support member above a support surface so that the grooves open upwardly and said pivot axis extends generally horizontally.

3. A security display rack for articles, said rack comprising:

an elongated support member having an elongated surface facing in a first direction and a plurality of grooves extending through the support member and opening at said elongated surface, each of said grooves being adapted to have at least a portion of one of the articles inserted therein with the grooves spacing the articles along the support member;

an elongated locking member adapted to at least partially cover the open ends of said grooves to impede removal of the articles from the grooves;

means for mounting the locking member for pivotal movement about a pivot axis between open and closed positions, said pivot axis being adjacent one end of the elongated locking member;

said locking member lying along the elongated surface of the support member in said closed position to at least partially close the open ends of all of the grooves sufficiently to impede removal of the articles from the grooves;

said pivot axis extending generally transverse to the elongated support member and the locking member being movable about the pivot axis away from the grooves generally in said first direction toward said open position;

locking means for locking the locking member in said closed position;

said elongated support member having a recess therein and said locking means includes a first locking element carried by said locking member and adapted to be received in said recess in said closed position and cooperating means in said recess and carried by said elongated support member for cooperating with the first locking element to lock the locking member in said closed position, said first locking element being spaced from said pivot axis; and means coupled to the support member for elevating the support member above a support surface so that the grooves open upwardly and said pivot axis extends generally horizontally.

4. A security display rack as defined in claim 3 wherein said elongated support member includes a channel having first and second legs interconnected by a web and each of said grooves includes a groove section in each of said first and second legs.

5. A security display rack as defined in claim 3 wherein said cooperating means includes a second locking element in said recess, said recess being covered by said locking member in said closed position whereby said first and second locking elements are within said recess in said closed position and substantially concealed by said elongated support member and said locking member.

6. A security display rack for articles, said rack comprising:

an elongated channel having first and second legs interconnected by a web, each of said legs extending away from said web generally in a first direction and terminating in a free end;

each of said legs having a groove section therein opening at the free end of the associated leg, each of said groove sections being adapted to have at least a portion of one of the articles inserted therein;

an elongated locking member;

means for mounting the locking member for pivotal movement about a pivot axis between open and closed positions;

said locking member lying along the free ends of the channel in said closed position to at least partially close the open ends of all of the groove sections sufficiently to impede removal of the articles from the groove sections;

said pivot axis extending generally transverse to the elongated support member and the locking member being movable about the pivot axis away from the grooves generally in said first direction toward said open position; and locking means for locking the locking member in said closed position.

7. A security display rack as defined in claim 6 wherein said locking means includes a first locking element carried by said locking member and adapted to be received in said channel in said closed position and cooperating means carried by said channel for cooperating with the first locking element to lock the locking member in said closed position, at least a portion of said cooperating means lying between said legs of said channel.

8. A security display rack as defined in claim 7 wherein said cooperating means includes a second locking element in said channel whereby the first and second locking elements are within the channel and substantially concealed by the channel and the locking member.

9. A security display rack as defined in claim 8 wherein said cooperating means is mounted on one of said legs of said channel.

10. A security display rack as defined in claim 6 including an elongated flexible element having first and second enlarged abutments adjacent the opposite ends thereof, said first abutment being in said channel with the flexible element extending through at least one of said groove sections.

* * * * *